United States Patent
Dion

(10) Patent No.: US 9,869,258 B2
(45) Date of Patent: *Jan. 16, 2018

(54) EGR FOR A TWO-STROKE CYCLE ENGINE WITHOUT A SUPERCHARGER

(71) Applicant: Achates Power, Inc., San Diego, CA (US)

(72) Inventor: Eric P. Dion, Encinitas, CA (US)

(73) Assignee: ACHATES POWER, INC., San Diego, CA (US)

(*) Notice: Subject to any disclaimer, the term of this patent is extended or adjusted under 35 U.S.C. 154(b) by 63 days.

This patent is subject to a terminal disclaimer.

(21) Appl. No.: 15/007,077

(22) Filed: Jan. 26, 2016

(65) Prior Publication Data

US 2016/0138499 A1 May 19, 2016

Related U.S. Application Data

(63) Continuation of application No. 13/782,802, filed on Mar. 1, 2013, now abandoned, which is a (Continued)

(51) Int. Cl.
F02B 33/44 (2006.01)
F02M 25/07 (2006.01)
(Continued)

(52) U.S. Cl.
CPC .......... *F02D 41/0077* (2013.01); *F02B 25/06* (2013.01); *F02B 25/08* (2013.01);
(Continued)

(58) Field of Classification Search
CPC .. F02D 41/0007; F02M 260/05; F02M 26/08; F02M 26/23; F02M 26/34; F02B 25/06; F02B 25/08; F02B 37/02; F02B 37/04; F02B 37/10; F02B 47/08; F02B 72/02; F02B 75/28; F02B 29/0406;
(Continued)

(56) References Cited

U.S. PATENT DOCUMENTS 2,025,177 A * 12/1935 Pateras ................ F02B 71/04
123/46 R
2,522,118 A 9/1950 Guercken ...................... 60/731
(Continued)

FOREIGN PATENT DOCUMENTS

AT 514054 B1 * 1/2015 ............. F02M 26/34
DE 19840554 A1 3/1999
(Continued)

OTHER PUBLICATIONS

EPO Communication pursuant to 94(3) EPC dated May 4, 2017 for related EP Patent Application No. 14723518.8.
(Continued)

*Primary Examiner* — Thai Ba Trieu
(74) *Attorney, Agent, or Firm* — Terrance A. Meador; Julie J. Muyco

(57) ABSTRACT

A two-stroke cycle, turbo-driven, opposed-piston engine with one or more ported cylinders and uniflow scavenging has no supercharger. The engine includes a high pressure EGR loop and a pump in the EGR loop to boost the pressure of the recirculated exhaust products.

3 Claims, 2 Drawing Sheets

Related U.S. Application Data continuation-in-part of application No. 13/068,679, filed on May 16, 2011, now Pat. No. 8,549,854.

(51) Int. Cl.

| | | |
|---|---|---|
| *F02B 71/00* | (2006.01) | |
| *F02B 75/04* | (2006.01) | |
| *F02D 41/00* | (2006.01) | |
| *F02B 47/08* | (2006.01) | |
| *F02M 26/34* | (2016.01) | |
| *F02M 26/23* | (2016.01) | |
| *F02M 26/05* | (2016.01) | |
| *F02B 25/08* | (2006.01) | |
| *F02B 75/28* | (2006.01) | |
| *F02B 37/04* | (2006.01) | |
| *F02B 37/10* | (2006.01) | |
| *F02B 39/10* | (2006.01) | |
| *F02B 25/06* | (2006.01) | |
| *F02B 37/02* | (2006.01) | |
| *F02M 26/08* | (2016.01) | |
| *F01B 7/02* | (2006.01) | |
| *F02B 75/02* | (2006.01) | |
| *F02B 29/04* | (2006.01) | |

(52) U.S. Cl.
CPC .............. *F02B 37/02* (2013.01); *F02B 37/04* (2013.01); *F02B 37/10* (2013.01); *F02B 39/10* (2013.01); *F02B 47/08* (2013.01); *F02B 75/02* (2013.01); *F02B 75/28* (2013.01); *F02D 41/0007* (2013.01); *F02M 26/05* (2016.02); *F02M 26/08* (2016.02); *F02M 26/23* (2016.02); *F02M 26/34* (2016.02); *F01B 7/02* (2013.01); *F02B 29/0406* (2013.01); *F02B 2075/025* (2013.01); *F02B 2275/14* (2013.01); *Y02T 10/121* (2013.01); *Y02T 10/144* (2013.01)

(58) Field of Classification Search
CPC ........... F02B 2075/025; F02B 2075/14; Y02T 10/121; Y02T 10/144
USPC ......... 60/605.2, 605.1, 608; 123/46 R, 46 B, 123/52.2, 568.11–568.12; 290/40 R
See application file for complete search history.

(56) References Cited

U.S. PATENT DOCUMENTS

| | | | |
|---|---|---|---|
| 2,581,600 A | 1/1952 | Pateras | 123/46 R |
| 2,581,668 A * | 1/1952 | Guercken | F02B 37/02 60/605.1 |
| 2,583,430 A * | 1/1952 | Guercken | F02B 71/06 60/605.1 |
| 2,646,779 A | 7/1953 | Fiser | 123/51 BA |
| 2,914,909 A * | 12/1959 | Kubik | F02B 71/02 60/595 |
| 2,963,008 A * | 12/1960 | Waldrop | F02B 71/04 123/46 A |
| 2,982,087 A | 5/1961 | Foster | 60/595 |
| 3,005,306 A | 10/1961 | Vannevar | 60/595 |
| 3,022,425 A | 2/1962 | Rockstead | 290/40 R |
| 3,130,716 A * | 4/1964 | Creswick | F02B 71/00 123/46 R |
| 3,146,765 A * | 9/1964 | Bush | F02B 71/00 123/46 R |
| 3,182,643 A | 5/1965 | Tenney | 123/51 R |
| 3,485,221 A * | 12/1969 | Feeback | F01B 7/14 123/51 AA |
| 4,090,479 A | 5/1978 | Kaye | 123/51 B |
| 4,372,256 A | 2/1983 | Firey | 123/46 A |
| 5,203,311 A | 4/1993 | Hitomi et al. | 123/559.1 |
| 5,307,632 A | 5/1994 | Gottemoller et al. | 60/608 |
| 5,509,394 A | 4/1996 | Hitomi et al. | 123/559.1 |
| 5,657,630 A | 8/1997 | Kjemtrup et al. | 60/605.2 |
| 5,771,867 A | 6/1998 | Amstutz et al. | 123/568.21 |
| 5,771,868 A | 6/1998 | Khair | 60/605.2 |
| 5,791,146 A | 8/1998 | Dungner | 60/605.2 |
| 5,906,098 A | 5/1999 | Woollenweber et al. | 60/608 |
| 5,974,792 A | 11/1999 | Isobe | 60/285 |
| 6,041,602 A | 3/2000 | Dickey | 60/605.2 |
| 6,170,443 B1 | 1/2001 | Hofbauer | 123/51 B |
| 6,216,460 B1 | 4/2001 | Shao et al. | 60/605.2 |
| 6,227,180 B1 | 5/2001 | Hoffmann et al. | 60/280 |
| 6,256,993 B1 | 7/2001 | Halimi et al. | 60/608 |
| 6,311,494 B2 | 11/2001 | McKinley et al. | 60/605.2 |
| 6,318,085 B1 | 11/2001 | Torno et al. | 60/611 |
| 6,354,084 B1 | 3/2002 | Mckinley et al. | 60/605.2 |
| 6,412,278 B1 | 7/2002 | Matthews | 60/605.2 |
| 6,435,166 B1 | 8/2002 | Sato et al. | 60/605.2 |
| 6,625,984 B2 | 9/2003 | Gerke et al. | 60/602 |
| 6,742,335 B2 | 6/2004 | Beck et al. | 60/605.2 |
| 6,851,256 B2 | 2/2005 | Chamoto et al. | 60/280 |
| 6,925,971 B1 | 8/2005 | Peng et al. | 123/46 R |
| 6,948,475 B1 | 9/2005 | Wong et al. | |
| 6,955,162 B2 * | 10/2005 | Larson | F02M 26/34 60/605.2 |
| 6,957,632 B1 | 10/2005 | Carlson et al. | 123/46 R |
| 7,043,914 B2 | 5/2006 | Ishikawa | 60/605.2 |
| 7,047,916 B2 | 5/2006 | Pischinger et al. | 123/46 R |
| 7,237,381 B2 | 7/2007 | Kolavennu et al. | 60/608 |
| 7,246,490 B2 | 7/2007 | Sumser et al. | 60/605.2 |
| 7,281,531 B1 | 10/2007 | Fulton et al. | 123/568.17 |
| 7,370,474 B2 | 5/2008 | Minami | 60/286 |
| 7,444,804 B2 | 11/2008 | Hashizume | 60/280 |
| 7,490,594 B2 | 2/2009 | Van Dyne et al. | 123/559.1 |
| 7,784,436 B2 | 8/2010 | Lemke et al. | 123/51 R |
| 7,845,317 B2 | 12/2010 | Max et al. | 123/46 E |
| 7,886,528 B2 | 2/2011 | Danby et al. | 60/286 |
| 7,992,389 B2 | 8/2011 | Furman et al. | 60/608 |
| 8,127,544 B2 | 3/2012 | Schwiesow et al. | 123/46 R |
| 8,176,736 B2 * | 5/2012 | Janssen | F02M 26/34 60/605.2 |
| 8,522,551 B2 | 9/2013 | Tomita et al. | 60/612 |
| 8,549,854 B2 | 10/2013 | Dion et al. | 60/605.2 |
| 8,677,749 B2 | 3/2014 | Laimboeck et al. | 123/46 R |
| 8,789,499 B2 | 7/2014 | Alonso | 123/51 R |
| 8,806,869 B2 | 8/2014 | Petrovic | 60/612 |
| 9,074,524 B2 | 7/2015 | Eybergen et al. | F02B 33/38 |
| 2002/0078934 A1 | 6/2002 | Hohkita et al. | 60/602 |
| 2002/0174648 A1 | 11/2002 | Minami | 60/297 |
| 2005/0257759 A1 | 11/2005 | Pischinger et al. | 123/46 R |
| 2006/0075995 A1 | 4/2006 | Liu et al. | 123/568.12 |
| 2008/0036312 A1 | 2/2008 | Max et al. | 310/46 |
| 2008/0115493 A1 | 5/2008 | Wolf et al. | 60/605.2 |
| 2008/0127947 A1 | 6/2008 | Hofbauer et al. | 123/51 R |
| 2009/0159022 A1 | 6/2009 | Chu | 123/52.2 |
| 2009/0173071 A1 * | 7/2009 | Kapich | F02M 26/23 60/605.2 |
| 2009/0194079 A1 | 8/2009 | Nagae et al. | 123/568.11 |
| 2009/0249783 A1 | 10/2009 | Gokhale et al. | 60/602 |
| 2009/0260603 A1 | 10/2009 | Bucknell | 123/564 |
| 2009/0266339 A1 | 10/2009 | Cleeves | 123/48 R |
| 2010/0024414 A1 | 2/2010 | Hittle et al. | 60/602 |
| 2010/0147269 A1 | 6/2010 | Flowers et al. | 123/51 R |
| 2010/0293943 A1 | 11/2010 | Teng et al. | 60/602 |
| 2010/0293944 A1 | 11/2010 | Hunter | 60/605.2 |
| 2011/0022289 A1 | 1/2011 | Hofbauer | 701/103 |
| 2011/0056199 A1 | 3/2011 | Gokhale et al. | 60/602 |
| 2011/0114070 A1 | 5/2011 | Liu et al. | 123/590 |
| 2011/0289916 A1 | 12/2011 | Dion et al. | 60/605.2 |
| 2012/0037130 A1 | 2/2012 | Fuqua | 123/51 R |
| 2012/0046854 A1 | 2/2012 | Sangkyu et al. | 701/108 |
| 2012/0112469 A1 | 5/2012 | Durrett et al. | 60/595 |
| 2012/0125298 A1 | 5/2012 | Lemke et al. | |
| 2012/0192559 A1 | 8/2012 | Laimboeck et al. | 60/605.1 |
| 2012/0210985 A1 | 8/2012 | Fuqua et al. | |
| 2012/0260894 A1 | 10/2012 | Hayman | 123/559.1 |
| 2012/0260895 A1 | 10/2012 | Hayman et al. | 123/559.1 |
| 2012/0266851 A1 | 10/2012 | Hofbauer et al. | 123/69 R |
| 2012/0298077 A1 | 11/2012 | Elsbett et al. | 123/51 R |

(56) References Cited

U.S. PATENT DOCUMENTS

| | | | | |
|---|---|---|---|---|
| 2012/0330534 | A1 | 12/2012 | Cleeves et al. | 701/104 |
| 2013/0118441 | A1 | 5/2013 | Levy et al. | 123/197.4 |
| 2013/0152547 | A1* | 6/2013 | Hofbauer | F02M 26/43 |
| | | | | 60/274 |
| 2013/0174548 | A1 | 7/2013 | Dion | 60/605.2 |
| 2013/0232972 | A1 | 9/2013 | Heiermann | 60/605.2 |
| 2013/0333665 | A1 | 12/2013 | Pursifull | 123/399 |
| 2014/0026563 | A1 | 1/2014 | Dion et al. | F02M 25/0747 |
| 2014/0102418 | A1 | 4/2014 | Babu et al. | 123/51 R |
| 2014/0216411 | A1 | 8/2014 | Holmes | 123/45 E |
| 2014/0331656 | A1* | 11/2014 | Nagar | F02B 75/28 |
| | | | | 123/51 R |
| 2014/0373814 | A1 | 12/2014 | Herold et al. | 123/51 B |
| 2014/0373815 | A1 | 12/2014 | Nagar | 123/51 B |
| 2014/0373816 | A1 | 12/2014 | Nagar | 123/51 B |

FOREIGN PATENT DOCUMENTS

| | | | | |
|---|---|---|---|---|
| DE | 19809618 | A1 | 9/1999 | |
| DE | 10331187 | A1 | 2/2005 | |
| DE | 102012103389 | A1 * | 10/2012 | F02B 25/04 |
| GB | 1450815 | | 9/1976 | |
| JP | 04175449 | A | 6/1992 | |
| JP | 06123259 | A | 5/1994 | |
| JP | 2001073741 | A | 3/2001 | |
| JP | 2009115089 | A | 5/2009 | |
| JP | 2011157959 | A | 8/2011 | |
| JP | 2012/180814 | | 9/2012 | |
| JP | 2013007295 | A | 1/2013 | |
| JP | 2014122575 | A | 7/2014 | |
| RU | 2193674 | C1 | 11/2002 | |
| WO | WO-2008/071810 | A1 | 6/2008 | |
| WO | WO-2010/012919 | A1 | 2/2010 | |
| WO | WO-2011/007456 | A1 | 1/2011 | |
| WO | WO 2011/062618 | A1 | 5/2011 | |
| WO | WO 2011/146111 | A1 | 11/2011 | |
| WO | WO 2012/067643 | A1 | 5/2012 | |
| WO | WO 2013/126347 | A1 | 8/2013 | |
| WO | WO 2014/134417 | | 9/2014 | |

OTHER PUBLICATIONS

Translation of Office Acrtion dated Apr. 6, 2017, for Chinese patent application No. 201480010271.3.

Hofbauer, P., et al, *MTZ Worldwide*, "Opposed-Piston Opposed-Cylinder Engine for Heavy Duty Trucks", Apr. 2012, vol. 73, pp. 48-54.

Pirault, J and Flint, M. *Opposed Piston Engines: Evolution, Use, and Future Applications*, SAE International, Warrendale Penna., Oct. 2009, Section 3.2: Junkers Jumo 2005; 2010; pp. 55-99.

Pirault, J and Flint, M. *Opposed Piston Engines: Evolution, Use, and Future Applications*, SAE International, Warrendale Penna., Oct. 2009, Section 3.3: Junkers Jumo 2007B2; 2010; pp. 102-119.

Pirault, J and Flint, M. *Opposed Piston Engines: Evolution, Use, and Future Applications*, SAE International, Warrendale Penna., Oct. 2009, Section 7.3: Fairbanks Morse Model 38 OP Engine; 2010; pp. 346-372.

International Search Report & Written Opinion, PCT/US2011/000864, dated Aug. 1, 2011.

International Search Report & Written Opinion, PCT/US2014/019344, dated Jul. 21, 2014.

European Examination Report, dated Aug. 27, 2013 for European Patent Application 11721839.6.

Translation of Office Action dated Nov. 15, 2014, for Chinese patent application No. 2011800247174.

Translation of Office Action dated Jun. 10, 2015, for Chinese patent application No. 201180024717.4.

Translation of Office Action dated Mar. 3, 2015, for Japanese patent application No. 2013-511146.

Translation of Office Action dated Oct. 20, 2015, for Japanese patent application No. 2013-511146.

Non-Final Office Action dated Mar. 2, 2016, for U.S. Appl. No. 14/039,856.

Final Office Action dated Jun. 16, 2016 for U.S. Appl. No. 14/039,856.

Non-Final Office Action dated Jul. 7, 2017 for U.S. Appl. No. 15/215,940.

Office Action dated Aug. 16, 2017 for Japanese patent application No. 2015-560344.

* cited by examiner

EGR FOR A TWO-STROKE CYCLE ENGINE WITHOUT A SUPERCHARGER

PRIORITY AND RELATED APPLICATIONS

This application is a continuation of U.S. patent application Ser. No. 13/782,802, filed Mar. 1, 2013, which in turn is a continuation-in-part of U.S. patent application Ser. No. 13/068,679, filed May 16, 2011, now U.S. Pat. No. 8,549,854. The disclosure of U.S. patent application Ser. No. 13/782,802 is hereby incorporated by reference in its entirety herein.

This application contains subject matter related to that of commonly-assigned PCT application US2013/026737, filed Feb. 19, 2013, published as WO 2013/126347 A1 on Aug. 29, 2013.

BACKGROUND

The field is two-stroke cycle internal combustion engines. Particularly, the field relates to ported, uniflow-scavenged, two-stroke cycle engines with exhaust gas recirculation. More particularly, the field includes two-stroke cycle engines with one or more ported cylinders and uniflow scavenging in which an exhaust gas recirculation (EGR) construction provides a portion of the exhaust gasses produced by the engine in previous cycles for mixture with incoming charge air to control the production of NOx during combustion.

A two-stroke cycle engine is an internal combustion engine that completes a power cycle with a single complete rotation of a crankshaft and two strokes of a piston connected to the crankshaft. One example of a two-stroke cycle engine is an opposed-piston engine in which a pair of pistons is disposed in opposition in the bore of a cylinder for reciprocating movement in opposing directions. The cylinder has inlet and exhaust ports that are spaced longitudinally so as to be disposed near respective ends of the cylinder. The opposed pistons control the ports, opening respective ports as they move to their bottom center (BC) locations, and closing the ports as they move toward their top center (TC) locations. One of the ports provides passage of the products of combustion out of the bore, the other serves to admit charge air into the bore; these are respectively termed the "exhaust" and "intake" ports.

In FIG. 1, a two-stroke cycle internal combustion engine 49 is embodied by an opposed-piston engine having at least one ported cylinder 50. For example, the engine may have one ported cylinder, two ported cylinders, three ported cylinders, or four or more ported cylinders. Each cylinder 50 has a bore 52 and exhaust and intake ports 54 and 56 formed or machined in respective ends thereof. The exhaust and intake ports 54 and 56 each include one or more circumferential arrays of openings in which adjacent openings are separated by a solid bridge. In some descriptions, each opening is referred to as a "port"; however, the construction of a circumferential array of such "ports" is no different than the port constructions shown in FIG. 1. Exhaust and intake pistons 60 and 62 are slidably disposed in the bore 52 with their end surfaces 61 and 63 opposing one another. The exhaust pistons 60 are coupled to a crankshaft 71, the intake pistons are coupled to the crankshaft 72.

When the pistons 60 and 62 of a cylinder 50 are at or near their TC positions, a combustion chamber is defined in the bore 52 between the end surfaces 61 and 63 of the pistons. Fuel is injected directly into the combustion chamber through at least one fuel injector nozzle 100 positioned in an opening through the sidewall of a cylinder 50.

With further reference to FIG. 1, the engine 49 includes an air management system 51 that manages the transport of charge air provided to, and exhaust gas produced by, the engine 49. A representative air management system construction includes a charge air subsystem and an exhaust subsystem. In the air management system 51, the charge air subsystem includes a charge air source that receives intake air and processes it into charge air, a charge air channel coupled to the charge air source through which charge air is transported to the at least one intake port of the engine, and at least one air cooler in the charge air channel that is coupled to receive and cool the charge air (or a mixture of gasses including charge air) before delivery to the intake port or ports of the engine. Such a cooler can comprise an air-to-liquid and/or an air-to-air device, or another cooling device. The exhaust subsystem includes an exhaust channel that transports exhaust products from exhaust ports of the engine to an exhaust pipe.

With reference to FIG. 1, the air management system 51 includes a turbocharger 120 with a turbine 121 and a compressor that rotate on a common shaft 123. The turbine 121 is coupled to the exhaust subsystem and the compressor 122 is coupled to the charge air subsystem. The turbocharger 120 extracts energy from exhaust gas that exits the exhaust ports 54 and flows into the exhaust channel 124 directly from the exhaust ports 54, or from an exhaust manifold 125. In this regard, the turbine 121 is rotated by exhaust gas passing through it. This rotates the compressor 122, causing it to generate charge air by compressing intake air. In some instances, the charge air subsystem includes a supercharger 110; in these instances, the charge air output by the compressor 122 flows through a charge air channel 126 to a cooler 127, whence it is pumped by the supercharger 110 to the intake ports. Air compressed by the supercharger 110 can be output through a cooler 129 to an intake manifold 130. The intake ports 56 receive charge air pumped by the supercharger 110, through the intake manifold 130. Preferably, but not necessarily, in multi-cylinder opposed-piston engines, the intake manifold 130 is constituted of an intake plenum that communicates with the intake ports 56 of all cylinders 50.

The air management construction shown in FIG. 1 is equipped to reduce NOx emissions produced by combustion by recirculating exhaust gas through the ported cylinders of the engine. The recirculated exhaust gas is mixed with charge air to lower peak combustion temperatures, which lowers NOx emissions. This process is referred to as exhaust gas recirculation ("EGR"). The EGR construction shown in FIG. 1 utilizes exhaust gasses transported via an EGR loop external to the cylinder into the incoming stream of fresh intake air in the charge air subsystem. The recirculated gas flows through a conduit 131 under the control of the valve 138.

EGR constructions for uniflow-scavenged two-stroke cycle opposed-piston engines require a positive pressure differential from the intake manifold to the exhaust manifold in order to scavenge the cylinders during their port open periods. Thus, the pressure in the intake port of a cylinder must always be greater than in the exhaust port in order for exhaust gas to flow through the EGR channel into the charge air subsystem. In instances illustrated by FIG. 1, a supercharger in the charge air channel provides this positive pressure. However, there are other instances in which a turbo-charged opposed-piston engine may not include a supercharger. In such cases, there is a need to ensure positive flow of recirculated exhaust gasses for effective EGR operation.

SUMMARY

A solution to the problem is to equip an EGR loop of a turbo-driven opposed-piston engine with a pump in the EGR loop to boost the pressure of the recirculated exhaust products.

In one aspect, EGR is provided by an EGR loop having an input coupled to an exhaust port of the cylinder and a loop output coupled to the charge air channel. A pump in the EGR loop generates a pressure differential between the exhaust port and the air channel that causes the exhaust gas to flow through the EGR loop to the charge air channel where it mixes with charge air.

DETAILED DESCRIPTION

The EGR construction described in this specification is presented in an explanatory context that includes a uniflow-scavenging, two-stroke cycle engine of a type having at least one ported cylinder in which a pair of pistons is disposed with their end surfaces in opposition. A "ported" cylinder includes one or more of intake and exhaust ports formed or machined in a sidewall thereof. This explanatory context is intended to provide a basis for understanding a specific EGR construction embodiment by way of an illustrative example.

Figure 1:
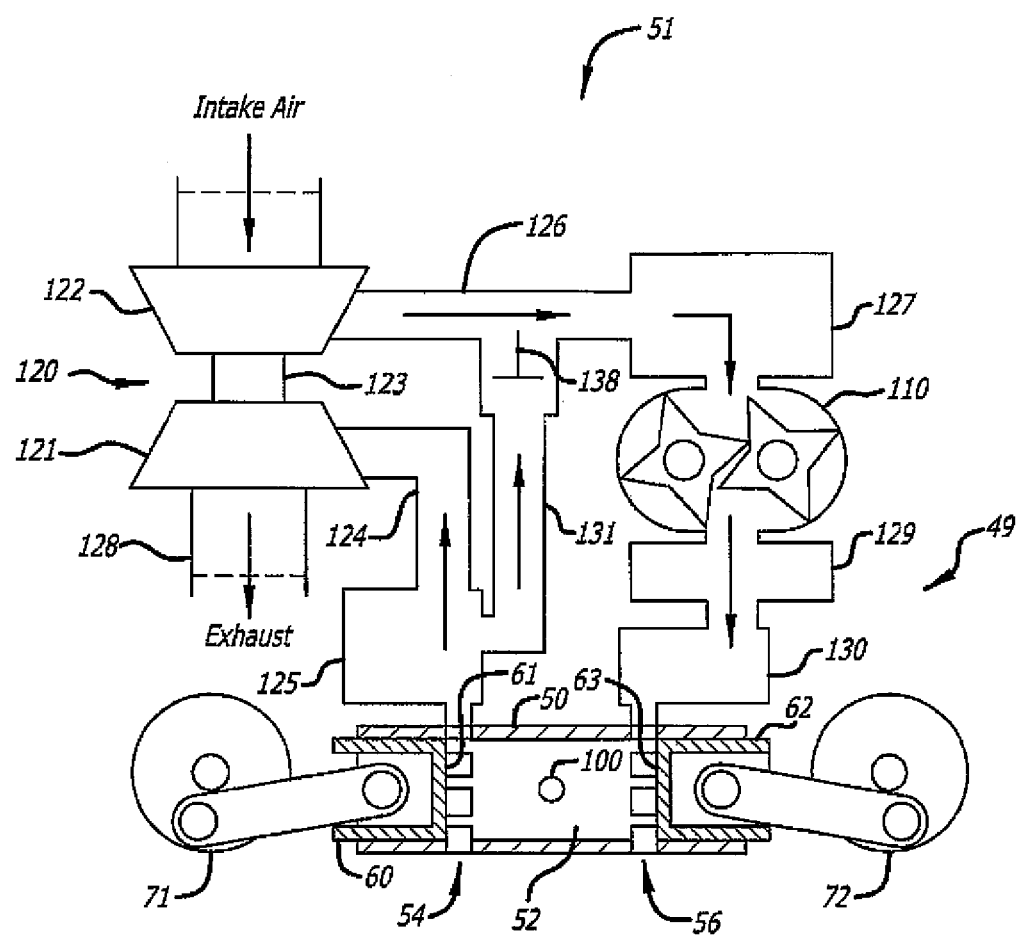
FIG. 1 is a conceptual schematic diagram of a two-stroke cycle engine of the opposed-piston type in which aspects of an air management system with EGR are illustrated.
Figure 2:
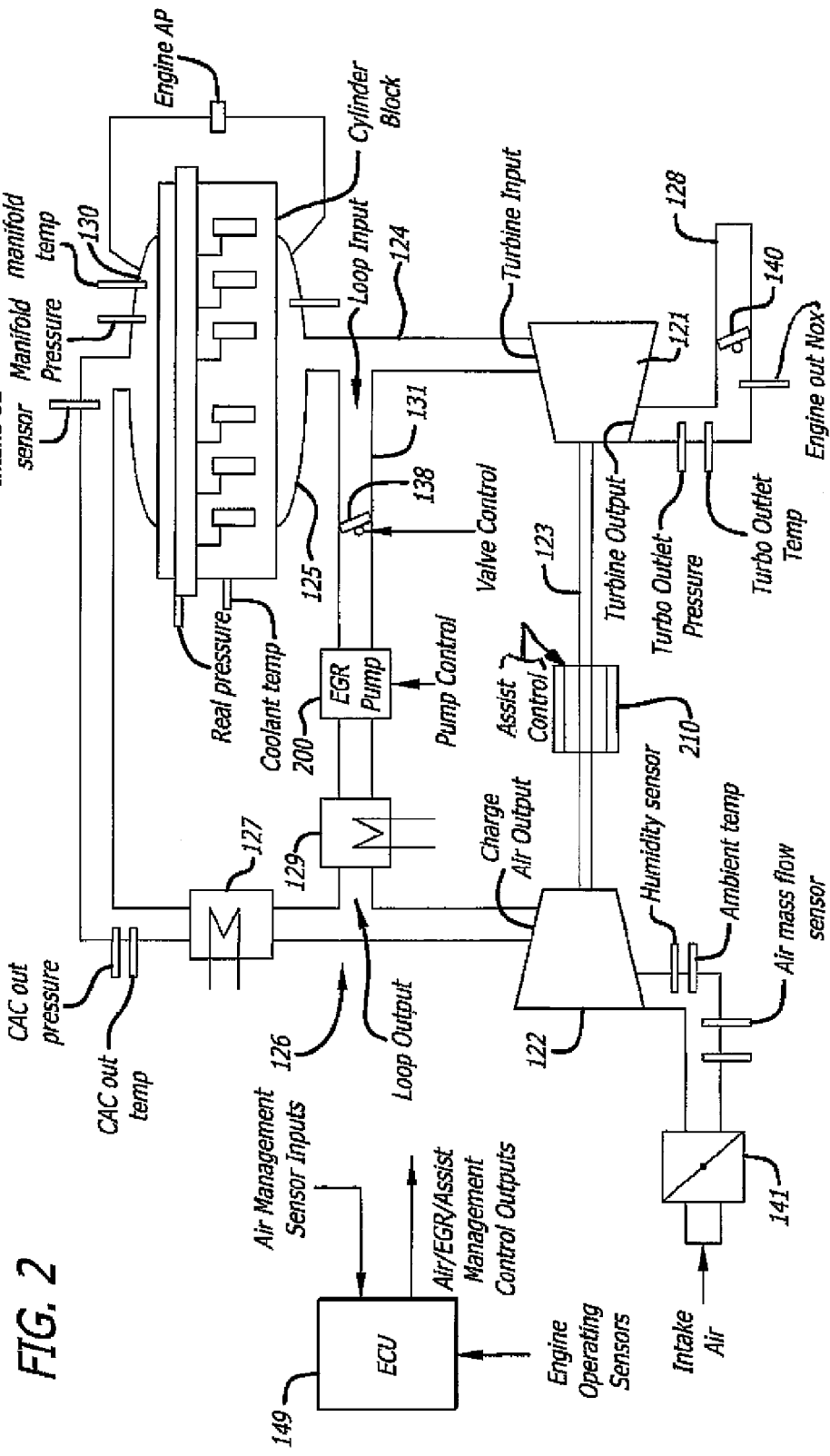
FIG. 2 is a conceptual schematic drawing illustrating a construction for EGR in a turbocharged two-stroke cycle opposed-piston engine without a supercharger.

With reference to FIG. 2, an opposed-piston engine having a construction similar to that of the engine seen in FIG. 1 is equipped with an EGR loop that channels exhaust gas from the exhaust subsystem into the charge air subsystem, but without the aid of a supercharger in the charge air subsystem. Preferably, the EGR loop construction is a high pressure configuration. In this regard, a high pressure EGR loop circulates exhaust gas obtained from the exhaust channel 124 through a loop input upstream (prior to the input) of the turbine 121 to a mixing point downstream (following the outlet) of the compressor 122. In this EGR loop the EGR valve 138 is operated to shunt a portion of the exhaust gas from the exhaust manifold 125 through the conduit 131 to be mixed with charge air output by the compressor 122 into the conduit 126. If no exhaust/air mixing is required the EGR valve 138 is fully shut and charge air with no exhaust gas is delivered to the cylinders. As the EGR valve 138 is increasingly opened, an increasing amount of exhaust gas is mixed into the charge air. This loop subjects the exhaust gas to the cooling effects of the cooler 127. A dedicated EGR cooler 129 can be incorporated into the conduit 131 in series with the valve 138.

EGR Loop Construction Including a Pump:

The high-pressure EGR loop construction seen in FIG. 2 includes an EGR pump 200 in series with the EGR valve 138. The outlet of the valve 138 is connected to the input of the EGR pump 200 whose purpose is to raise the pressure of recirculated exhaust gas from the level in the exhaust manifold 125 to the level in the intake manifold 130. The pressure is applied by the pump 200 from a point in the conduit 131, as opposed to the application of pressure in the charge air subsystem by a supercharger. This pressure creates a pressure differential between the intake and exhaust manifolds that pumps a portion of exhaust gas from the exhaust manifold 125 to the conduit 126 where it is mixed with the charge air and recirculated therewith into the intake manifold 130. Preferably, the pump 200 is an electrically-controlled, variable-speed pump, but other pump types (hydraulically-controlled, for example) are possible.

Power-Assisted Turbocharger:

It is useful that the turbocharger 120 be assisted in order to ensure a continuous positive pressure differential across the manifolds 125, 130 while the engine 49 is operating. In this regard, the turbocharger 120 includes a power-assist system 210, which can comprise, for example an electric motor/generator unit, that boosts turbocharger operation during start and low load conditions so as to add energy to the charge air flow when unassisted turbocharger operation is inadequate for it. Alternative turbo power-assist devices include hydraulic or pneumatic mechanisms. A turbocharger with a power-assist system is referred to as a "power-assisted turbocharger."

Control Mechanization:

An EGR control process for an EGR system that utilizes the construction illustrated in FIG. 2 is executed by an electronic control unit (ECU) 149 in response to specified engine operating conditions by automatically operating the valve 138, the pump 200, and the power assist system 210. Of course, operation of valves, throttles, and other associated elements that may be used for EGR and air management control can include any one or more of electrical, pneumatic, mechanical, and hydraulic actuating operations. For fast, precise automatic operation, it is preferred that valves, including the EGR valve 138, be high-speed, high-resolution, computer-controlled devices with a continuously-variable settings.

Preferably an EGR control process automatically operates the EGR system described and illustrated herein based upon one or more parameters relating to recirculated exhaust gas and to a mixture of recirculated exhaust gas and charge air. Parameter values are determined by a combination of one or more of sensors, calculations, and table lookup so as to manage the values of individual parameters and one or more ratios of EGR and mixture parameters in one or more cylinders. The sensors involved in determining parameter values can include those shown in FIG. 2 located between the intake throttle valve 141 and the exhaust valve 140 on the exhaust pipe 128, such as one or more sensors for: air mass flow, ambient temperature, humidity, CAC out temperature, CAC out pressure, intake manifold pressure, intake manifold temperature, engine ΔP, turbo outlet pressure, turbo outlet temp, and engine out NOx. The sensors can also be located on the cylinder block, for example sensors for real pressure and coolant temperature in or around the cylinder block.

An EGR construction for a two-stroke cycle engine without a supercharger has been described with reference to an opposed-piston engine having two crankshafts; however, it should be understood that various aspects of this EGR system can be applied to opposed-piston engines with one or more crankshafts. Moreover, various aspects of this EGR construction can be applied to opposed-piston engines with ported cylinders disposed in opposition, and/or on either side of one or more crankshafts. Accordingly, the protection afforded to this construction is limited only by the following claims.

What is claimed is:

1. A uniflow-scavenged, two-stroke cycle, opposed-piston engine comprising:
   at least one cylinder with piston-controlled exhaust and intake ports, the exhaust and intake ports being longitudinally spaced so as to be disposed near respective ends of the at least one cylinder;
   two crankshafts, in which each exhaust piston couples to a first crankshaft and each intake piston couples to a second crankshaft;
   an exhaust channel coupled to at least one exhaust port of the engine; a charge air channel coupled to at least one intake port of the engine;
   a power-assisted turbocharger with:
      a compressor output coupled to the charge air channel;
      a turbine coupled to the exhaust channel for being rotated by exhaust gas passing through the turbine; and
      a turbine output coupled to an exhaust pipe;
   a high pressure exhaust gas recirculation (EGR) loop having a loop input coupled to the exhaust channel upstream of the turbine and a loop output coupled to the charge aft channel downstream of the compressor and simultaneously connected to an inlet of at least one charge aft cooler;
   an electrically-driven pump in the high pressure EGR loop to pump exhaust gas through the high pressure EGR loop into the charge air channel;
   an electrically-controlled variable valve in the high pressure EGR loop between the loop input and the pump; and
   a control unit connected to provide control signals for the power-assisted turbocharger, the pump, and the valve, wherein the engine has no supercharger.

2. The uniflow-scavenged, two-stroke cycle, opposed-piston engine of claim 1, in which the EGR loop further includes an EGR cooler in series with the pump.

3. A method of operating the uniflow-scavenged, two-stroke cycle, opposed-piston engine, the opposed-piston engine including:
   at least one cylinder with piston-controlled exhaust and intake ports, the exhaust and intake ports being longitudinally spaced so as to be disposed near respective ends of the at least one cylinder;
   two crankshafts, in which each exhaust piston couples to a first crankshaft and each intake piston couples to a second crankshaft; an exhaust channel coupled to at least one exhaust port of the engine; a charge air channel coupled to at least one intake port of the engine;
   a power-assisted turbocharger with:
      a compressor output coupled to the charge air channel;
      a turbine coupled to the exhaust channel for being rotated by exhaust gas passing through the turbine; and
      a turbine output coupled to an exhaust pipe;
   a high pressure exhaust gas recirculation (EGR) loop having a loop input coupled to the exhaust channel upstream of the turbine and a loop output coupled to the charge air channel downstream of the compressor and simultaneously connected to an inlet of at least one charge air cooler;
   an electrically-driven pump in the high pressure EGR loop to pump exhaust gas through the high pressure EGR loop into the charge air channel;
   an electrically-controlled variable valve in the high pressure EGR loop between the loop input and the pump;
   a control unit connected to provide control signals for the power-assisted turbocharger, the pump, and the valve; in which the engine has no supercharger, the method comprising:
   pressurizing charge air via the compressor of the power-assisted turbocharger;
   cooling the charge air being pressurized in at least one cooler;
   delivering the charge air being pressurized and cooled to an intake port of each of the one or more cylinders; and
   pumping engine exhaust gas in the high pressure exhaust gas recirculation (EGR) loop to an inlet of the at least one air charge cooler by controlling the electrically-driven pump in the high pressure EGR loop to reduce Nox emissions.

* * * * *

UNITED STATES PATENT AND TRADEMARK OFFICE
CERTIFICATE OF CORRECTION

| | | |
|---|---|---|
| PATENT NO. | : 9,869,258 B2 | Page 1 of 1 |
| APPLICATION NO. | : 15/007077 | |
| DATED | : January 16, 2018 | |
| INVENTOR(S) | : Dion | |

It is certified that error appears in the above-identified patent and that said Letters Patent is hereby corrected as shown below:

In the Claims

-- Column 5, Claim 1, Line 25, change "aft" to read "air" --

Signed and Sealed this
Tenth Day of April, 2018

Andrei Iancu
*Director of the United States Patent and Trademark Office*